(12) United States Patent
Tsukada et al.

(10) Patent No.: US 9,213,311 B2
(45) Date of Patent: Dec. 15, 2015

(54) VOLUME HOLOGRAM TRANSFER FOIL

(75) Inventors: Dai Tsukada, Tokyo-to (JP); Koji Eto, Tokyo-to (JP); Nobuko Oikawa, Tokyo-to (JP); Minoru Azakami, Tokyo-to (JP); Takaki Miyachi, Tokyo-to (JP); Shinya Sato, Tokyo-to (JP)

(73) Assignee: DAI NIPPON PRINTING CO., LTD., Tokyo-to (JP)

( * ) Notice: Subject to any disclaimer, the term of this patent is extended or adjusted under 35 U.S.C. 154(b) by 179 days.

(21) Appl. No.: 13/825,413

(22) PCT Filed: Jul. 13, 2011

(86) PCT No.: PCT/JP2011/066014
§ 371 (c)(1),
(2), (4) Date: Mar. 21, 2013

(87) PCT Pub. No.: WO2012/043014
PCT Pub. Date: Apr. 5, 2012

(65) Prior Publication Data
US 2013/0182301 A1 Jul. 18, 2013

(30) Foreign Application Priority Data

Sep. 30, 2010 (JP) ................. 2010-222613
Jun. 29, 2011 (JP) ................. 2011-144676

(51) Int. Cl.
*G03H 1/00* (2006.01)
*G03H 1/02* (2006.01)
*G02B 5/23* (2006.01)
*G03H 1/04* (2006.01)
(Continued)

(52) U.S. Cl.
CPC ............... *G03H 1/02* (2013.01); *B44C 1/1716* (2013.01); *G03H 1/0252* (2013.01); *B42D 25/328* (2014.10); *G03H 1/0248* (2013.01); *G03H 2250/10* (2013.01); *G03H 2250/39* (2013.01); *G03H 2250/43* (2013.01); *G03H 2270/23* (2013.01)

(58) Field of Classification Search
None
See application file for complete search history.

(56) References Cited

U.S. PATENT DOCUMENTS

2005/0191560 A1  9/2005  Otaki et al.
2008/0009412 A1*  1/2008  Funada et al. ............... 503/200

FOREIGN PATENT DOCUMENTS

JP  2002-358018 A  12/2002
JP  2009-000839 A  1/2009
(Continued)

OTHER PUBLICATIONS

Extended European Search Report dated Feb. 26, 2014; Appln. No. 11828575.8-1904/2624074; PCT/JP2011066014.
(Continued)

*Primary Examiner* — Jade R Chwasz
(74) *Attorney, Agent, or Firm* — Ladas & Parry LLP (57) ABSTRACT

The present invention provides a volume hologram transfer foil which has good foil cutting characteristics and is used to manufacture a volume hologram laminate by transferring a volume hologram layer to an adherend by thermocompression. The volume hologram transfer foil includes a base material, a protective layer, a volume hologram layer, and a heat seal layer, wherein the protective layer contains a hard coat component, a rupture elongation control component, and a foil cutting characteristic control component which has a thermal expansion coefficient different from those of the hard coat component and rupture elongation control component and is incompatible with the two components.

14 Claims, 1 Drawing Sheet

(51) Int. Cl.
  *B44C 1/17* (2006.01)
  *B42D 25/328* (2014.01)

(56) References Cited

FOREIGN PATENT DOCUMENTS

| JP | 2009-009105 A | 1/2009 |
| JP | 2010-122600 A | 6/2010 |
| JP | 2010-122601 A | 6/2010 |

OTHER PUBLICATIONS

International Search Report; mailed Oct. 18, 2011, PCT/JP2011/066014.

* cited by examiner

VOLUME HOLOGRAM TRANSFER FOIL

TECHNICAL FIELD

The present invention relates to a volume hologram transfer foil which is used, for example, to transfer a volume hologram layer to an adherend to be attached by thermocompression bonding to produce a volume hologram laminate, and which has excellent foil cutting characteristics.

BACKGROUND ART

In current plastic cards typified by, for example, credit cards and cash cards, cards with hologram have come to be widely used mainly from the viewpoint of the prevention of replication and impartation of designs. Because the hologram has the advantage that not only it has excellent three-dimensional expression and beauty but also its replication is difficult, it is frequently used in security applications and the like.

Holograms are based on the principle that two lights (object light and reference light) having the same wavelength are made to interfere with each other to record the wave-front of the object light as interference fringe in a photosensitive material, and when light having the same wavelength as the reference light used in the recording of the interference fringe is applied, the recorded interference fringe causes a diffraction phenomenon, enabling the reproduction of the same wave-front as that of the original object light.

Holograms as described above may be classified into a few types by the recording form of the interference fringe. Typically, these holograms may be classified into a surface relief type hologram and volume hologram. Here, the surface relief type hologram is the type of hologram in which a fine concave and convex pattern is formed on the surface of the hologram layer to thereby record a hologram. On the other hand, the volume hologram is the type of hologram in which interference fringes produced by the interference of light are three-dimensionally written as fringes differing in refractive index in the direction of the thickness to thereby record a hologram. Because the volume hologram is the type of hologram in which a hologram image is recorded by a difference in the refractive index of material, it is more difficult to replicate a hologram image than in the case of a relief type hologram. The volume hologram is therefore expected to be useful in applications for means of preventing forgeries of marketable securities and cards.

Various methods are known corresponding to an object to which a hologram is provided as a method of providing a hologram to marketable securities and cards in the case of using a hologram as means for the impartation of designs and prevention of forgeries. Though a method in which a slit-like hologram is webbed and a method in which a hologram is embedded in a medium in such a manner as to be visible from the outside are known, a method in which a hologram is attached to a predetermined position is generally used. Among these methods, a more simplified method has come to be widely used in which a hologram layer is transferred from a hologram transfer foil with a hologram formed on an optional base material to thereby apply the hologram layer to a predetermined position.

Here, in volume holograms, a plurality of materials differing in refractive index is generally used and, usually, photopolymerizable materials which can be polymerized by applying specific light are used. For this, it is known that the hologram layer in which the volume hologram has been recorded tends to be increased in mechanical strength. Further, because the volume hologram is characterized by the feature that a hologram image is recorded by three-dimensional arrangement of difference in refractive index, the thickness of the layer where the hologram is formed tends to be larger than that of the above relief type hologram. It has been therefore pointed out that the volume hologram layer is inferior in foil cutting characteristics and it is therefore difficult to use the method of transferring a hologram layer by using the hologram layer transfer foil.

In such a situation, Patent Literature 1 discloses an example in which the rupture elongation and rupture strength of the hologram layer in which a volume hologram is recorded are adjusted to predetermined values to thereby also enable the volume hologram to use the aforementioned transfer method using the hologram layer transfer foil. However, there is the problem that it is difficult to attain the compatibility between clear recording of a hologram image and adjustment to a predetermined elongation at breakage and rupture strength from, for example, the reason that usable materials used to record a clear hologram image are limited.

Further, the impartation of designs and prevention of forgeries which are achieved using a hologram are desired to be more improved in versatility in view of its usefulness. Along with this, a method has been developed in which the hologram transfer foil is made into a lengthy form to continuously transfer a volume hologram thereby enabling the volume hologram to be continuously disposed on a predetermined position in an industrial production process. However, this requires partial transfer of the volume hologram formed on the transfer foil, with the result that higher foil cutting characteristics are required.

In light of the above problem, Patent Literature 2 discloses technologies in which a notch is formed in the hologram layer to improve the foil cutting characteristics of a hologram layer. Although the foil cutting characteristics are improved by the technologies in which a notch is formed, the technologies had the problem that, for example, the notch remains in the product obtained after the transfer operation, which spoils the beauties of the product and have come to further involve a new problem concerning productivities such as costs and complicated production process. Accordingly, it is desired to develop a transfer foil which has foil cutting characteristics improved to the extent that partial transfer can be attained without any problem even if a notch or the like is not formed.

CITATION LIST

Patent Literature

Patent Literature 1: Japanese Patent Application publication (JP-A) No. 2009-009105

Patent Literature 2: JP-A No. 2010-122600

SUMMARY OF INVENTION

Technical Problem

In view of the above situation, the inventors of the present invention have made studies as to the measures taken to utilize an ionizing radiation-curable resin instead of using a thermoplastic resin which has been usually used as the protective layer. However, it has been clarified that though the brittleness of the hologram layer is promoted and foil cutting characteristics of the hologram layer are improved by using a certain type of ionizing radiation-curable resin as a component contained in the protective layer, the brittleness of the protective layer constituted only of an ionizing radiation-curable resin is excessively promoted, giving rise to defects such as breakage of the protective layer during or after the transfer operation. Accordingly, it is desired to develop a transfer foil which enables partial transfer and has foil cutting characteristics improved to the extent that it is not broken.

The present invention has been made in view of the above problem and it is a main object of the present invention to provide a volume hologram transfer foil which is used to manufacture a volume hologram laminate by transferring a volume hologram layer to an adherend by thermocompression and has better foil cutting characteristics.

Solution to Problem

The above problem can be solved by providing a volume hologram transfer foil according to the present invention, the volume hologram transfer foil comprising a base material, a protective layer formed on the base material, a volume hologram layer formed on the protective layer and a volume hologram recorded, and a heat seal layer formed on the volume hologram layer, wherein the protective layer contains a hard coat component formed of an ionizing radiation-curable resin, a rupture elongation control component which improves a rupture elongation of the protective layer, and a foil cutting characteristic control component which has a thermal expansion coefficient different from those of the hard coat component and the rupture elongation control component and is incompatible with the two components.

When, for example, the above protective layer is formed only of the above hard coat component, the hardness is excessively increased, bringing about, for example, the possibility that the protective layer is broken when or after the volume hologram layer is transferred. According to the present invention, however, the hard coat component and rupture elongation control component are mixed prior to the formation, thereby improving the rupture elongation of the protective layer and making it possible to provide flexibility.

Further, the protective layer in the present invention contains the foil cutting characteristic control component, which is incompatible with the hard coat component and rupture elongation control component, and therefore, the foil cutting characteristic control component can be dispersed in the form of microparticles in the protective layer. Then, the foil cutting characteristic control component has a thermal expansion coefficient different from those of the above two components and is changed in volume by, for example, a change in environmental temperature, thereby causing strain and microcracks in the hard coat component and rupture elongation control component existing around the foil cutting characteristic control component.

This ensures that the brittleness of the entire protective layer is promoted, allowing the foil cutting characteristics to be put into a better condition because the foil cutting characteristic control component can be dispersed into the entire protective layer.

Therefore, a hologram layer can be transferred continuously from, for example, a lengthy volume hologram transfer foil, enabling improvements in productivity.

In the above invention, the ionizing radiation-curable resin which is the hard coat component of the protective layer is preferably an ultraviolet-curable resin. This is because the ultraviolet-curable resin has high versatility.

In the above invention, the rupture elongation control component of the above protective layer is preferably an ionizing radiation-curable resin. This is because the ionizing radiation-curable resin has a relatively lower molecular weight and a lower viscosity than a thermoplastic resin and the like, and a coating solution to be used in the formation of the protective layer can also be easily prepared.

Further, in the above invention, the number of functional groups of an oligomer which is a raw material composition for the ionizing radiation-curable resin which is the rupture elongation control component is preferably less than the number of functional groups of an oligomer which is a raw material composition for the ionizing radiation-curable resin which is the hard coat component. This is because the protective layer can be provided with flexibility and better foil cutting characteristics.

Further, in the above invention, the molecular weight of an oligomer which is a raw material composition for the ionizing radiation-curable resin which is the rupture elongation control component is preferably larger than that of an oligomer which is a raw material composition for the ionizing radiation-curable resin which is the hard coat component. This is because the rupture elongation of the protective layer can be increased and moderate flexibility can be imparted. Therefore, the breakage of the protective layer during or after the transfer operation caused by the excess promotion of brittleness can be scarcely generated.

In the above invention, a monomer or oligomer which is the raw material composition of the ionizing radiation-curable resin which is the rupture elongation control component preferably contains the same functional group of a monomer or oligomer which is the raw material composition of the ionizing radiation-curable resin which is the hard coat component. This reason is that the rupture elongation control component and the hard coat component can be simultaneously polymerized, enabling simplification of the production process.

In the above invention, the rupture elongation control component of the protective layer can preferably provide surface tack characteristics. This is because it is necessary to secure the adhesiveness required between the base material and the protective layer when producing the volume hologram transfer foil of the present invention.

Further, in the above invention, the foil cutting characteristic control component of the protective layer preferably has a melting point equal to or less than the heating temperature when the transfer foil is cut. This reason is that the foil cutting characteristic control component melts during heat transfer, so that the space where the foil cutting characteristic control component exists is put into the same state as a pore, which promotes the brittleness of the protective layer. Accordingly, the foil cutting characteristics of the protective layer can be more improved.

In the above invention, the base material is preferably processed by release treatment on the side with the protective layer formed. This is because the base material is easily released when the volume hologram layer is transferred.

Advantageous Effects of Invention

The present invention produces such an effect as to develop a volume hologram transfer foil which is used to produce a volume hologram laminate by utilizing thermocompression to transfer a volume hologram layer to an adherend and has good foil cutting characteristics.

DESCRIPTION OF EMBODIMENTS

A volume hologram transfer foil according to the present invention will be explained in detail below.

The volume hologram transfer foil of the present invention comprises a base material, a protective layer formed on the base material, a volume hologram layer formed on the protective layer and having a volume hologram recorded, and a heat seal layer formed on the volume hologram layer, wherein the protective layer contains a hard coat component formed of an ionizing radiation-curable resin, a rupture elongation control component which improves the rupture elongation of the protective layer, and a foil cutting characteristic control component which has a thermal expansion coefficient different from those of the hard coat component and rupture elongation control component and is incompatible with the two components.

Figure 1:
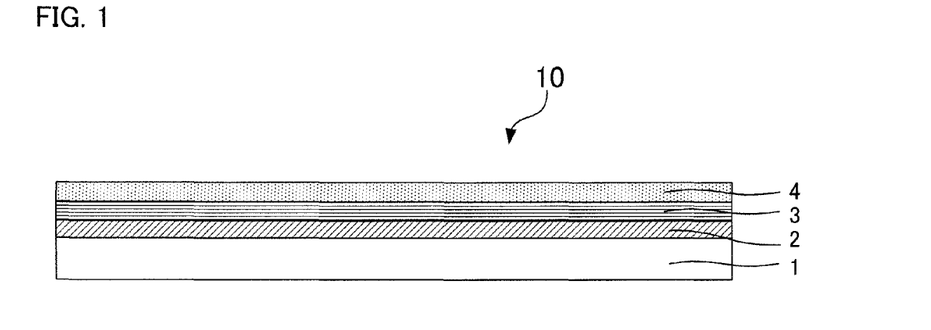
FIG. 1 is a schematic sectional view showing an example of a volume hologram transfer foil according to the present invention.

The volume hologram transfer foil as described above according to the present invention will be explained with reference to the drawings. FIG. 1 is a schematic sectional view showing an example of the volume hologram transfer foil of the present invention. As illustrated in FIG. 1, a volume hologram transfer foil 10 according to the present invention comprises a base material 1, a protective layer 2 the base material 1, a volume hologram layer 3 formed on the protective layer 2 and having a volume hologram recorded, and a heat seal layer 4 formed on the volume hologram layer 3.

In the volume hologram transfer foil of the present invention, the protective layer contains the hard coat component, rupture elongation control component, and foil cutting characteristic control component and therefore, the volume hologram transfer foil can be made to be a volume hologram transfer foil providing good foil cutting characteristic when a volume hologram layer is transferred to an adherend by means of thermocompression to manufacture a volume hologram laminate.

Such a volume hologram transfer foil according to the present invention is generally used to produce a volume hologram laminate by transferring a volume hologram layer to an optional adherend.

The volume hologram transfer foil of the present invention is provided with at least a base material, a protective layer, a volume hologram layer, and a heat seal layer and may be provided with other optional structures according to the need.

Each structure used in the volume hologram layer of the present invention will be explained one by one.

1. Protective Layer

The protective layer to be used in the present invention will be explained. The protective layer used in the present invention contains the followings which will be explained later: a hard coat component formed of an ionizing radiation-curable resin, a rupture elongation control component which improves the rupture elongation of the protective layer, and a foil cutting characteristic control component which has a thermal expansion coefficient different from those of the hard coat component and rupture elongation control component and is incompatible with the two components.

Figure 2:
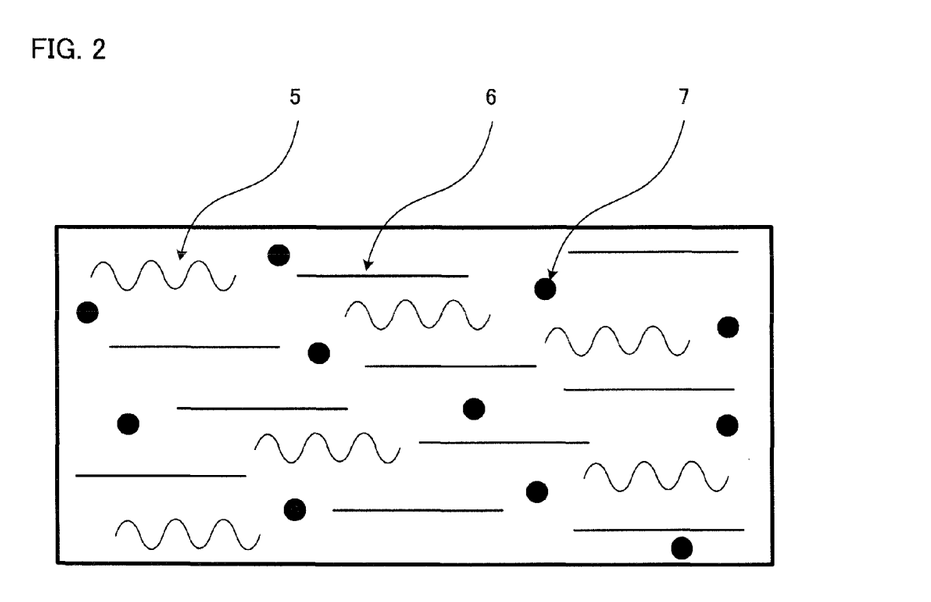
FIG. 2 is a typical view showing an example of a protective layer of the volume hologram transfer foil according to the present invention.

The protective layer as described above will be explained with reference to the drawings. FIG. 2 is a typical view showing an example of the above protective layer. As illustrated in FIG. 2, the protective layer contains a hard coat component 6 containing an ionizing radiation-curable resin, a rupture elongation control component 5 which improves the rupture elongation of the protective layer, and a foil cutting characteristic control component 7 which has a thermal expansion coefficient different from those of the hard coat component and rupture elongation control component and is incompatible with these two components, and the foil cutting characteristic control component 7 is put into such a state that it is uniformly dispersed in the form of microparticles in the hard coat component 6 and rupture elongation control component 5.

Generally, a thermoplastic resin is widely used in the protective layer currently used for such a volume hologram layer and therefore, the protective layer has the problem concerning foil cutting characteristics. This is the reason why the foil cutting characteristics were improved by, for example, forming a notch, to deal with the problem. However, when the notch is formed, this gives rise to the problem concerning damages to outward beauty and also, complicated production process due to the addition of the notch production process, and therefore, the volume hologram transfer foil needs to be improved in foil cutting characteristics.

Studies have been made as to a protective layer utilizing an ionizing radiation-curable resin in place of a thermoplastic resin to solve the above problem. However, it has been found that such a protective layer formed of an ionizing radiation-curable resin having a relatively higher hardness poses a new problem concerning breakage of the protective layer by excess promotion of brittleness during or after the transfer operation.

In light of this, the protective layer in the present invention is formed from a mixture of the above hard coat component and rupture elongation control component to solve the above problem. This reason is that when the protective layer is formed from a mixture of the above two components, the protective layer is improved in rupture elongation, so that it can be improved in flexibility.

Further, the protective layer in the present invention is provided with the foil cutting characteristic control component, which is incompatible with the hard coat component and rupture elongation control component, and therefore, the foil cutting characteristic control component can be dispersed in the form of microparticles in the protective layer.

Moreover, the foil cutting characteristic control component has a thermal expansion coefficient different from those of the above two components and gives rise to the generation of strains and microcracks in the hard coat component and rupture elongation control component existing around the foil cutting characteristic control component if it is changed in volume by the change of environmental temperature.

As mentioned above, the brittleness of the entire protective layer is promoted by strains and microcracks generated in the above two components by the foil cutting characteristic control component dispersed in the form of microparticles in the entire protective layer, which puts the foil cutting characteristic of the protective layer into good condition. Accordingly, for example, the volume hologram layer can be continuously transferred from the lengthy volume hologram transfer foil, enabling improvement in productivity.

Further, with the use of the protective layer, the surface of the volume hologram laminate can be coated with the protective layer when the volume hologram transfer foil of the present invention is used to transfer the volume hologram layer to an adherend, and therefore, the transferred volume hologram layer can be protected.

Each structure of the protective layer in the present invention will be explained below.

(1) Hard Coat Component

The hard coat component of the protective layer in the present invention will be explained. The hard coat component used in the present invention includes an ionizing radiation-curable resin.

The ionizing radiation-curable resin is one which is generally obtained by polymerizing, as its major component, a monomer, oligomer, or polymer having a radically polymerizable active group in its structure as a coating film-forming component, though no particular limitation is imposed on the ionizing radiation-curable resin insofar as it can be cured by applying ionizing radiation. Among these resins, one obtained by polymerizing a monomer or oligomer as major components is preferable. This reason is that the monomer or oligomer has the advantage that it is relatively less viscous and is therefore used more easily than a polymer when a coating solution of the ionizing radiation-curable resin is prepared.

An oligomer is particularly preferable in the present invention.

Further herein, the above ionizing radiation is defined as one including all ultraviolet rays (UV-A, UV-B, and UV-C), visible rays, gamma rays, X-rays, and electron rays though it is divided by the quantum energy of electromagnetic waves.

Therefore, ultraviolet rays are preferable though ultraviolet rays (UV), visible rays, gamma rays, X-rays, or electron rays may be applied as the ionizing radiation used to cure the above ionizing radiation-curable resin. This is because the ultraviolet rays have high versatility. In other words, an ultraviolet-curable resin is preferable as the hard coat component in the present invention.

Specific examples of the ultraviolet-curable resin include, though not particularly limited to, epoxy-modified acrylate resins, urethane-modified acrylate resins and acryl-modified polyesters.

Among these ultraviolet-curable resins, those polymerized using a (meth)acrylate derivative and the like as a monomer or those polymerized using, for example, an urethaneacrylate (SP value: 9.05) or polyester acrylate (SP value: 9 to 14) as an oligomer are preferable.

As the ionizing radiation-curable resin which is the hard coat component in the present invention, those produced by polymerizing an oligomer are preferable as mentioned above. As such an oligomer, those having relatively large number of functional groups are preferable. This reason is that with increase in the number of functional groups of the oligomer, the crosslinking density of the hard coat component is easily increased, so that the hardness of the protective layer is more improved. Accordingly, the brittleness of the protective layer is easily promoted and there is therefore a tendency that the foil cutting characteristics are more improved.

The number of functional groups of the oligomer is preferably in a range from 5 to 50 and more preferably in a range from 5 to 10.

When the number of functional groups of the oligomers is excessively small, there is the case where crosslinking points among oligomers tend to be smaller, so that the protective layer shows no proper hardness, and there is the possibility that an ionizing radiation-curable resin having satisfactory foil cutting characteristics cannot be eventually obtained. When the number of functional groups is excessively large on the other hand, crosslinking points tend to be excessively increased, and there is therefore the possibility that, for example, the protective layer is broken when or after the volume hologram layer is transferred.

Further, in the present invention, the molecular weight of the oligomer which is the raw material composition of the ionizing radiation-curable resin to be used as the hard coat component is preferably 10000 or less and more preferably in a range from 1000 to 5000.

This reason is as follows. When the molecular weight of the oligomer which is the raw material composition of the ionizing radiation-curable resin to be used as the hard coat component is excessively large, the degree of freedom of the molecular chain of the oligomer tends to be excessively large, so that the protective layer having moderate hardness cannot be obtained, and there is therefore the possibility that good foil cutting characteristics cannot be exhibited.

When the molecular weight of the oligomer is excessively small on the other hand, the degree of freedom of the molecular chain of the oligomer tends to be excessively small, which allows excessive increase in hardness, and therefore, there is the possibility of, for example, breakage of the protective layer when or after the volume hologram layer is transferred.

(2) Rupture Elongation Control Component

Next, the rupture elongation control component of the protective layer in the present invention will be explained. The rupture elongation control component used in the present invention is characterized by the feature that it improves the rupture elongation of the protective layer.

The rupture elongation control component in the present invention is mixed with the hard coat component having high hardness and the mixture is contained in the protective layer, thereby making it possible to increase the rupture elongation of the protective layer and impart appropriate flexibility to the protective layer. Accordingly, the foil cutting characteristics of the protective layer is improved.

The rupture elongation control component is one which provides a rupture elongation falling preferably in a range from 50% to 1000% and more preferably in a range from 100% to 500%.

When the rupture elongation exceeds the above range, the flexibility tends to be excessively increased when the rupture elongation control component is mixed with the hard coat component to form the protective layer and there is therefore the possibility that the foil cutting characteristics of the protective layer cannot be well maintained.

When the rupture elongation is less than the above range, appropriate flexibility cannot be provided to the protective layer when the rupture elongation control component is mixed with the hard coat component to form the protective layer, so that the hardness of the protective layer tends to be excessively increased and there is therefore the possibility that defects such as breakage of the protective layer are produced during or after the transfer operation.

Incidentally, the rupture elongation is measured by a method according to JIS K 5600. To mention specifically, the protective layer is allowed to stand at 20° C. under atmosphere of 65% RH for 24 hr and then, stretched in the following condition: sample width: 15 mm, distance between chucks: 25 mm, RANGE: 1%, and tensile speed: 10 mm/min, to obtain the rupture elongation by measuring the elongation percentage of elongation at breakage to the self-length when any breakage or crack is observed when the protective layer is stretched.

Examples of the rupture elongation control component in the present invention include thermoplastic resins and ionizing radiation-curable resins, though any material may be used without any particular limitation insofar as it improves the rupture elongation of the protective layer. Specific examples of the thermoplastic resin include polyester resins, polyolefin resins, and polyamide resins and specific examples of the ionizing radiation-curable resins include ultraviolet-curable resins, electron ray-curable resins, visible ray-curable resins, and infrared ray-curable resins.

Among materials that improve the rupture elongation of the protective layer, ionizing radiation-curable resins are preferable as the rupture elongation control component in the present invention. This reason is that an ionizing radiation-curable resin has a relatively lower molecular weight and a lower viscosity than a thermoplastic resin, and therefore, a coating solution used to form the protective layer is easily prepared.

Further, as the rupture elongation control component, an ionizing radiation-curable resin having flexibility is preferable though any material may be used without any particular limitation insofar as it is an ionizing radiation-curable resin, and the ionizing radiation-curable resin which is the rupture elongation control component is particularly preferably more flexible to the aforementioned hard coat component.

This reason is that if the rupture elongation control component is more flexible to the ionizing radiation-curable resin which is the hard coat component, the rupture elongation control component can provide flexibility to the protective layer when it is mixed with the ionizing radiation-curable resin which is the hard coat component to form the protective layer of the invention. Therefore, this suppresses excess increase in hardness and hence suppresses the generation of defects such as breakage while keeping good foil cutting characteristics, during or after the transfer operation.

Here, though no particular limitation is imposed on the above flexibility insofar as the protective layer has flexibility to the extent that it can be prevented from breaking, a structure having the flexibility required in the present invention may be one having the rupture elongation falling in the above range.

Although no particular limitation is imposed on the ionizing radiation-curable resin which is the rupture elongation control component in the present invention as long as it has flexibility, those obtained by polymerizing compounds containing, as its major component, a monomer, oligomer, or polymer having a radically polymerizable active group are preferable. Among these resins, a resin produced by polymerizing a monomer or oligomer is preferable and a resin produced by polymerizing an oligomer as its major component is preferable.

The reason why the above ionizing radiation-curable resins polymerized using oligomers as its major component are preferable is the same as the reason described in the above "(1) Hard coat component" and the explanations of the reason are therefore not repeated here.

As the ionizing radiation used to cure the ionizing radiation-curable resin which is the rupture elongation control component in the present invention, those described in the above "(1) Hard coat component" may be used. Among these rays, ultraviolet rays are preferable. This is because the ultraviolet rays have high versatility. Accordingly, ultraviolet-curable resins are preferable as the rupture elongation control component in the present invention.

Further, specific examples of the ultraviolet-curable resin include the same ones which can be used as the hard coat component. Specifically, examples of the ultraviolet-curable resin include epoxy modified acrylate resins, urethane modified acrylate resins, and acryl modified polyesters. Among these resins, ultraviolet-curable resins produced by polymerizing compounds containing (meth)acrylate derivative as a major component monomer or by polymerizing compounds containing urethane acrylate or polyester acrylate as a major component oligomer are preferable.

The number of functional groups of the oligomer which is the raw material composition of the ionizing radiation-curable resin which is the rupture elongation control component is preferably in a range from 1 to 5 and more preferably in a range from 2 to 3.

The number of functional groups of the oligomer which is the raw material composition of the ionizing radiation-curable resin which is the rupture elongation control component is preferably lower than the number of functional groups of the oligomer which is the raw material composition of the ionizing radiation-curable resin which is the hard coat component.

This reason is that when the number of functional groups of the oligomer which is the raw material composition of the ionizing radiation-curable resin which is the rupture elongation control component is designed to be lower than the number of functional groups of the oligomer which is the raw material composition of the ionizing radiation-curable resin which is the hard coat component, an ionizing radiation-curable resin having a low crosslinking density can be produced. Therefore, when such an ionizing radiation-curable resin is blended with the hard coat component and contained in the protective layer, flexibility can be imparted to the protective layer, so that the protective layer can be adjusted to a proper hardness, ensuring that the breakage of the protective layer when or after the volume hologram layer is transferred can be prevented.

The molecular weight of the oligomer which is the raw material composition of the ionizing radiation-curable resin which is the rupture elongation control component in the present invention is preferably in a range from 3000 to 20000 and more preferably in a range from 8000 to 15000.

Further, the molecular weight of the oligomer which is the raw material composition of the rupture elongation control component is preferably larger than that of the oligomer which is the raw material composition of the ionizing radiation-curable resin which is the hard coat component. The molecular weight of the oligomer of the rupture elongation control component is preferably two times or more and more preferably in a range from 2.5 to 10 times that of the oligomer of the hard coat component.

When the difference in molecular weight is larger than the above range, the hardness of the rupture elongation control component tends to be excessively low. There is therefore the case where the hardness of the protective layer becomes excessively low when the rupture elongation control component is blended with the hard coat component to form the protective layer, with the result that there is the possibility that good foil cutting characteristics cannot be obtained.

On the other hand, when the difference in molecular weight is smaller than the above range, the rupture elongation control component tends to obtain only insufficient flexibility and there is therefore the case where no flexibility can be provided to the protective layer. As a result, the hardness of the protective layer is increased and there is the possibility of generation of defects such as breakage of the protective layer when or after the volume hologram layer is transferred.

As the monomer or oligomer which is the raw material composition of the rupture elongation control component in the present invention, those having the same functional group as the monomer or oligomer which is the raw material composition of the ionizing radiation-curable resin which is the hard coat component are preferable. This is because the both raw material compositions can be crosslinked at the same time by irradiation with the same ionizing radiation.

Further, although any material may be used as the rupture elongation control component in the present invention without any particular limitation insofar as it improves the rupture elongation of the protective layer, a rupture elongation control component which can impart surface tack characteristics is preferably used. This is because the adhesion to the laminated base material and volume hologram layer is kept. Although examples of a material which can provide the surface tack characteristics include thermoplastic resins, and ionizing radiation-curable resins, ionizing radiation-curable resins are preferable in the present invention, and among these ionizing radiation-curable resins, ultraviolet-curable resins are more preferable. The reason why the ultraviolet-curable resins are preferable is the same as that mentioned above, and therefore, the description of the reason is not repeated here.

Specific examples of the ultraviolet-curable resin which can provide such surface tack characteristics include urethaneacrylate resins and epoxyacrylate resins which can be cured by radical polymerization.

Although no particular limitation is imposed on the content of the rupture elongation control component in the present invention insofar as it is a level high enough to impart flexibility to the protective layer, the weight ratio of the rupture elongation control component to the hard coat component is as follows: it is preferable that the ratio of the hard coat component:rupture elongation control component=3 to 9:7 to 1. Particularly, it is more preferable that the ratio of the hard coat component:rupture elongation control component=5 to 8:5 to 2.

When the content of the rupture elongation control component is excessively low, there is the case where only insufficient flexibility can be imparted to the protective layer in the present invention, bringing about excessively high hardness of the protective layer, and there is therefore the possibility that the protective layer is broken when or after the volume hologram layer is transferred. When the content of the rupture elongation control component is excessively high, on the other hand, there is the case where the flexibility of the protective layer is excessively high and there is therefore the possibility of deteriorated foil cutting characteristics.

(3) Foil Cutting Characteristic Control Component

The foil cutting characteristic control component in the present invention will be explained. The foil cutting characteristic control component used in the present invention is characterized by the feature that it has a thermal expansion coefficient different from those of the hard coat component and rupture elongation control component and is incompatible with the above two components.

According to the present invention, the foil cutting characteristic control component is incompatible with the hard coat component and rupture elongation control component and can be therefore dispersed in the form of microparticles in the protective layer.

Further, since the foil cutting characteristic control component has a thermal expansion coefficient different from those of the above two components, it is blended in the protective layer containing the hard coat component and rupture elongation control component which have been crosslinked by irradiation with ionizing radiation, which gives rise to the generation of strains and microcracks in the crosslinked hard coat component and rupture elongation control component existing around the foil cutting characteristic control component in the protective layer due to variations in environmental temperature, thereby enabling the promotion of the brittleness of the protective layer.

Therefore, as mentioned above, the foil cutting characteristic control component can be dispersed in the form of microparticles in the protective layer and therefore, the brittleness of the entire protective layer is promoted, thereby making possible to develop a protective layer having better foil cutting characteristics.

Whether two components are incompatible or not can be determined by using an index showing general compatibility, and for example, the solubility parameter (SP value) is preferably used.

The solubility parameter (SP value) is used as an index indicating compatibility or incompatibility in a mixed system containing at least two components and is calculated according to, for example, SMALL's calculation method. It is known that the smaller the difference of the SP value is, the higher the compatibility is, and the larger the difference of the SP value is, the higher the incompatibility is. In the present invention, there is no particular limitation to the foil cutting characteristic control component insofar as it is incompatible with the hard coat component and rupture elongation control component to the extent that it is dispersed in these two components.

Though, in the present invention, there is no particular limitation to the foil cutting characteristic control component insofar as it is incompatible with the hard coat component and rupture elongation control component to the extent that it is dispersed in these two components, the difference in SP value is preferably 1 or more.

When the difference in SP value is small, the foil cutting characteristic control component tends to be well compatible with other components, with the possibility that it is not dispersed in the form of microparticles in the protective layer, and there is therefore the case where strains or microcracks that promote the brittleness of the protective layer are scarcely generated, with the possibility that the foil cutting characteristics of the protective layer is deteriorated.

In the present invention, no particular limitation is imposed on the thermal expansion coefficient of the foil cutting characteristic control component as long as it is different from those of the hard coat component and rupture elongation control component to the extent that the difference in thermal expansion coefficients of the foil cutting characteristic control component and the two components causes the generation of stress, giving rise to strains and microcracks.

As the thermal expansion coefficient in the present invention, those obtained by measuring using a thermomechanical analyzer (TMA) may be used.

Further, in the present invention, the foil cutting characteristic control component preferably has a melting point equal to or lower than the heating temperature when the transfer foil is cut. This reason is that because the foil cutting characteristic control component is dissolved in the thermal transfer operation, the space where the foil cutting characteristic control component exists is put into the same state as a pore, which promotes the brittleness of the protective layer. Accordingly, the foil cutting characteristics of the protective layer can be improved.

Although no particular limitation is imposed on the melting point of the foil cutting characteristic control component insofar as it is equal to or lower than the heating temperature when the transfer foil is cut, it is preferably in a range from 40° C. to 200° C. and more preferably 60° C. to 120° C. because the temperature of the transfer foil when the transfer foil is cut is in a range from 60° C. to 200° C. in general.

This reason is that when the melting point of the foil cutting characteristic control component exceeds the above temperature range, the foil cutting characteristic control component is not dissolved when the transfer foil is cut and the portion of the foil cutting characteristic control component is not put into the same state as a pore though there is a change in volume, and the foil cutting characteristics cannot be improved sufficiently.

When the melting point of the foil cutting characteristic control component is less than the above temperature range on the other hand, there is the possibility that it is difficult to handle at normal temperature and to produce a transfer foil.

Specific examples of the foil cutting characteristic control component include particles or beads of polyethylene type resins. More specific examples of the foil cutting characteristic control component include a polyethylene wax (SP value: 8.0) and fatty acid. Among these compounds, a polyethylene wax is more preferable. This reason is that the wax is dissolved when heated, causing easy variation in volume, which enables more improvement in the foil cutting characteristics of the protective layer.

With regard to the content of the foil cutting characteristic control component, the ratio by weight of the foil cutting characteristic control component is preferably 1 part by weight to 10 parts by weight and more preferably in a range from 2 parts by weight to 5 parts by weight based on 100 parts by weight of the total weight of the hard coat component and rupture elongation control component.

(4) Other Components

Although the protective layer in the present invention contains at least the aforementioned hard coat component, rupture elongation control component, and foil cutting characteristic control component, and may contain, as required, optional components other than the above components. Any material may be used as the optional components to be used in the present invention without any particular limitation as long as it can provide desired functions to the protective layer and volume hologram transfer foil in the present invention.

Examples of the optional components used in the protective layer include a UV absorbing component and photopolymerization initiator. Hereinafter, these UV absorbing component and photopolymerization initiator will be explained.

(i) UV Absorbing Component

When the protective layer in the present invention contains the UV absorbing component, a UV protective function can be provided to the protective layer and the protective layer can therefore prevent a hologram image and colors from deteriorating with time when the volume hologram layer transferred to an adherend by using the volume hologram transfer foil of the present invention is exposed to sunlight or lighting sources for a long period of time.

When an ultraviolet preventive layer which will be explained later is formed separately from the protective layer, an UV absorbing component may be or may not be contained in the protective layer. Further, when the ultraviolet preventive layer is formed separately from the protective layer and the protective layer contains the UV absorbing component, it is preferable to formulate an ultraviolet absorber and UV absorbing component differing in an ultraviolet absorbing wavelength band in the ultraviolet preventive layer and protective layer respectively. This is because an ultraviolet absorbing region is increased and light resistance can be improved.

Examples of the UV absorbing component may include organic type ultraviolet absorbers and inorganic type ultraviolet absorbers. Specific examples of the organic type ultraviolet absorber include salicylate type, benzophenone type, benzotriazole type, benzoate type, substituted acrylonitrile type, nickel chelate type, hindered amine type, salicylic acid type, hydroquinone type, and triazine type ultraviolet absorbers. Specifically, metal oxide type microparticles such as microparticles of titanium oxide, zinc oxide, or cerium oxide may be widely used as the inorganic type ultraviolet absorber.

Further, the UV absorbing component may be an ultraviolet absorbing resin with an ultraviolet absorbing group bonded with the side chain thereof. Examples of the ultraviolet absorbing group may include those having the structures of the above organic type ultraviolet absorber or inorganic type ultraviolet absorber. Because, in an ultraviolet absorbing resin, the ultraviolet absorbing part is fixed in the resin, the ultraviolet absorber is not moved to the volume hologram layer. For this, such a phenomenon that the hologram is discolored by the contact between the protective layer and the volume hologram layer can be prevented. Further, the fixed ultraviolet absorbing part never bleeds out, so that the ultraviolet absorbing capacity is not deteriorated.

Examples of the ultraviolet absorbing resin as described above include, though not limited to, a copolymer of methylmethacrylate and a benzophenone type ultraviolet absorber (trademark: UVA635L, manufactured by BASF Japan Ltd.), copolymers of methylmethacrylate and a benzotriazole type ultraviolet absorber (trademark: VANARESIN UVA-73A, Shin-Nakamura Chemical Co., Ltd., trademark: PUVA50M-40™, manufactured by Otsuka Chemical Co., Ltd., and trademarks: NCI-700 and NCI-900, manufactured by Nikko Kaken Co., Ltd.).

More preferable examples of the UV absorbing component include ultraviolet absorbing monomers. These ultraviolet absorbing monomers are each preferable as the component contained in the protective layer including the hard coat component containing the ionizing radiation-curable resin according to the present invention. When the protective layer is irradiated with an ionizing radiation such as ultraviolet rays to cure, an ultraviolet absorbing monomer is polymerized with the hard coat component which is an ionizing radiation-curable resin. For this, when the ultraviolet absorbing monomer is used, the crosslinking density of the protective layer can be more increased than in the case of formulating the aforementioned ultraviolet absorbing resin into the protective layer, whereby a protective layer having excellent durability can be obtained.

Examples of the ultraviolet absorbing monomer include benzophenone type ultraviolet absorbing monomers having a polymerizable unsaturated bond and benzotriazole type ultraviolet absorbing monomers having a polymerizable unsaturated bond. Examples of the benzophenone type ultraviolet absorbing monomers having a polymerizable unsaturated bond include 2-hydroxy-4-(methacryloyloxyethoxy)benzophenone, 2-hydroxy-4-acryloyloxybenzophenone, 2-hydroxy-4-methacryloyloxybenzophenone, 2-hydroxy-4-(2-acryloyloxy)ethoxybenzophenone, and 2-hydroxy-4-(2-methacryloyloxy)ethoxybenzophenone. Examples of the benzotriazole type ultraviolet absorbing monomers having a polymerizable unsaturated bond include, though not limited to, (2-[2'-hydroxy-5'-(methacryloyloxy)ethylphenyl]-2H-benzotriazole, 2[2'-hydroxy-5'-(acryloyloxy)phenyl]benzotriazole, 2-[2'-hydroxy-5'-(methacryloyloxy)phenyl]benzotriazole, 2-[2'-hydroxy-3'-t-butyl-5'-(methacryloyloxy)phenyl]benzotriazole, and 2-[2'-hydroxy-5-methyl-3-vinylphenyl]benzotriazole.

An ultraviolet preventive function can be provided to the protective layer by formulating the UV absorbing component. As to the ultraviolet preventive function preferable for the protective layer, the absorbance of the protective layer is preferably 0.5 or more and more preferably 0.7 or more at a wavelength of 340 nm. This reason is that when the absorbance of the protective layer is low, there is a fear that a hologram image and colors are significantly deteriorated when the volume hologram layer is exposed to sunlight or lighting sources for a long period of time.

Incidentally, the absorbance of the protective layer may be measured in the following manner. Specifically, first, the heat seal layer and volume hologram layer are removed from the volume hologram transfer foil. Then, light having a wavelength of 340 nm is made to be incident to the laminate of the base material and protective layer left unremoved at this time in the direction of the thickness of the laminate to measure absorbance. In succession, the absorbance of the protective layer is found using, as a reference, the absorbance of the base material measured in advance. The absorbance A is calculated from the equation: $A=-\log(I'/I)$, where I is the intensity of the incident light and I' is the intensity of the light passing through the laminate. The absorbance can be measured using, for example, an UV/Vis/NIR microscopic spectrophotometer MSV-350™, manufactured by JASCO CORPORATION or an UV/Vis/NIR spectrophotometer UV-3100PC™, manufactured by Shimadzu Corporation.

In order to attain the absorbance as described above in the protective layer 10 μm or less in thickness, it is necessary to contain an UV absorbing component having high ultraviolet absorbing ability in a high concentration, and it is preferable to use the aforementioned ultraviolet absorbing monomer also in this point.

With regard to the content of the above UV absorbing component, the ratio by weight of the UV absorbing component is preferably in a range from 0.1 part by weight to 10 parts by weight based on 100 parts by weight of the total weight of the hard coat component and rupture elongation control component. When the content of the UV absorbing component is small, there is the case where the protective layer has only insufficient ultraviolet preventive ability. When the content of the UV absorbing component is large, the hard coat component is relatively reduced and there is therefore the case where defects such as cloudiness are caused depending on the compatibility between the hard coat component and UV absorbing component.

(ii) Photopolymerization Initiator

It is preferable to contain a photopolymerization initiator when the protective layer in the present invention is cured by ionizing radiation such as ultraviolet rays.

Particularly, when the protective layer contains the aforementioned UV absorbing component, it is preferable to contain two or more types of photopolymerization initiators differing in absorbing wavelength. When the above UV absorbing component is contained, ultraviolet rays are entirely absorbed by the UV absorbing component and there is therefore the case where the protective layer is insufficiently cured by using only one type of photopolymerization initiator. Therefore, it is effective to use two or more types of photopolymerization initiators differing in absorption wavelength.

As the photopolymerization initiator, for example, a phosphorous type, acetophenone type, benzoin ether type, phosphine oxide type, benzophenone type, thioxanthone type, or amine type photopolymerization initiator may be used.

When two or more types of photopolymerization initiators differing in absorption wavelength are used in particular, it is preferable to use a combination of a phosphorous type photopolymerization initiator (for example, Irgacure 819™ manufactured by Ciba Speciality Chemical Co., Ltd. and Lucirin TPO™ manufactured by BASF Japan Ltd.) or the like which has an absorption wavelength on the long-wavelength side and an acetophenone type photopolymerization initiator (for example, Darocur 1173™, Irgacure 184™ and Irgacure 127™ manufactured by Ciba Speciality Chemical Co., Ltd.) or the like which is resistant to influence of oxygen inhibition.

As to the content of the above photopolymerization initiator, the ratio by weight of the photopolymerization initiator is preferably in a range from 0.1 part by weight to 10 parts by weight based on 100 parts by weight of the total weight of the hard coat component and rupture elongation control component. When the content of the photopolymerization initiator is small, this is a hindrance to the beginning of reaction. When the content of the photopolymerization initiator is large, the hard coat component is relatively reduced and there is therefore the case where the protective function of the protective layer is deteriorated by the reduction of the hard coat component.

(5) Protective Layer

The thickness of the protective layer used in the present invention is preferably in a range from 0.5 μm to 10 μm and more preferably in a range from 2.5 μm to 5 μm though it is selected properly corresponding to the use and type of volume hologram transfer foil according to the present invention.

This reason is as follows. When the thickness of the protective layer is too large, there is the case where this causes foil cutting failures and significant convex-concave difference in the partial transfer operation whereas when the thickness of the protective layer is too small on the other hand, there is the case where the volume hologram layer cannot be protected.

2. Base Material

The base material used in the present invention will be explained. The base material used in the present invention is preferably one in which the surface on the side formed with the protective layer is processed by means of release-treatment though no particular limitation is imposed on the base material insofar as it can support each structure of the volume hologram transfer foil of the present invention. This is because the protective layer is easily peeled from the base material.

Specific examples of the release treatment include a dip coating method, spray coating method, and roll coating method using a fluoro type releasing agent, stearate type releasing agent, or wax type releasing agent.

Further, the base material in the present invention may have a lengthy form or may be one other than those having a lengthy form.

The term "lengthy" means that the ratio (distance in the longitudinal direction/distance in a direction (direction of the width) perpendicular to the longitudinal direction) of the distance in the longitudinal direction/the distance in a direction (direction of the width) perpendicular to the longitudinal direction is 5 or more.

Specific examples of the base material to be used in the present invention may include resin films, for example, a polyethylene film, polypropylene film, polyethylene fluoride film, polyvinylidene fluoride film, polyvinyl chloride film, polyvinylidene chloride film, ethylene-vinyl alcohol copolymer film, polyvinyl alcohol film, polymethylmethacrylate film, polyether sulfone film, polyether ether ketone film, polyamide film, tetrafluoroethylene-perfluoroalkyl vinyl ether copolymer film, polyester film such as a polyethylene terephthalate film, and polyimide film.

Further, the thickness of the base material used in the present invention is usually in a range from 2 μm to 200 μm and preferably in a range from 10 μm to 50 μm though it is selected properly corresponding to the use and type of volume hologram transfer foil.

3. Volume Hologram Layer

Next, the volume hologram layer used in the present invention will be explained. The volume hologram layer used in the present invention is provided with a volume hologram recorded therein and is to be transferred to an adherend by using the volume hologram transfer foil of the present invention.

The volume hologram layer will be explained in detail below.

(1) Structural Material

There is no particular limitation imposed on the material constituting the volume hologram layer used in the present invention as long as it can record the volume hologram, and materials which are usually used for volume holograms may be optionally used. Examples of the material may include known volume hologram recording materials such as silver salt materials, dichromated gelatin emulsion, photopolymerizable resin, and photocrosslinkable resin. Particularly, (i) a first photosensitive material containing a binder resin, photopolymerizable compound, a photopolymerization initiator, and a sensitizing dye or (ii) a second photosensitive material containing a cationic polymerizable compound, a radically polymerizable compound, a photo-radical polymerization initiator, and a photocationic polymerization initiator type may be preferably used in the present invention.

The first photosensitive material and second photosensitive material will be explained one after another.

(i) First Photosensitive Material

The above first photosensitive material will be explained. As mentioned above, the first photosensitive material contains a binder resin, a photopolymerizable compound, a photopolymerization initiator, and a sensitizing dye.

(Binder Resin)

Examples of the binder resin may include a poly(meth)acrylate or its partial hydrolyzate, polyvinyl acetate or its hydrolyzate, copolymers using, as a polymer component, at least one of copolymerizable monomer groups such as acrylic acids and acrylates, or mixtures of these polymers, polyisopropylene, polybutadiene, polychloropylene, polyvinylacetal which is a partially acetalization product of polyvinyl alcohol, polyvinylbutyral, polyvinyl acetate, and vinyl chloride-vinyl acetate copolymer, or mixtures of these compounds. Here, when the volume hologram layer is formed, there is the case where a process of moving a monomer by heating is carried out to stabilize the recorded volume hologram. For this, the binder resin used in the present invention preferably has a relatively low glass transition temperature and allows a monomer to easily move.

(Photopolymerizable Compound)

As the photopolymerizable compound, a photopolymerizable and photocrosslinkable monomer, oligomer, or prepolymer which contains at least one ethylenic unsaturated bond in a molecule as will be mentioned later or mixtures of these compounds may be used. Specific examples of the photopolymerizable compound may include esters of unsaturated carboxylic acids and aliphatic polyhydric alcohol compounds and amide compounds of unsaturated carboxylic acids and aliphatic polyvalent amine compounds.

Here, specific examples of monomers of the unsaturated carboxylic acids may include acrylic acid, methacrylic acid, itaconic acid, crotonic acid, isocrotonic acid, and maleic acid. Specific examples of monomers of the above esters of aliphatic polyhydric alcohol compounds and unsaturated carboxylic acids may include acrylates such as ethylene glycol diacrylate, triethylene glycol diacrylate, 1,3-butanedioldiacrylate, tetramethylene glycol diacrylate, propylene glycol diacrylate, neopentyl glycol diacrylate, trimethylolpropanetriacrylate, trimethylolpropanetri(acryloyloxypropyl)ether, and trimethylolethanetriacrylate.

Examples of the above methacrylate may include tetramethylene glycol dimethacrylate, triethylene glycol dimethacrylate, neopentyl glycol dimethacrylate, trimethylolpropanetrimethacrylate, and trimethylolethanetrimethacrylate. Further, examples of the above itaconate may include ethylene glycol diitaconate, propylene glycol diitaconate, and 1,3-butanediol diitaconate. Examples of the crotonate include ethylene glycol dicrotonate, tetramethylene glycol dicrotonate, pentaerythritol dicrotonate, and sorbitol tetracrotonate. Examples of the isocrotonate may include ethylene glycol diisocrotonate, pentaerythritol diisocrotonate, and sorbitol tetraisocrotonate. Moreover, examples of the above maleate may include ethylene glycol dimaleate, triethylene glycol dimaleate, pentaerythritol dimaleate, and sorbitol tetramaleate.

Examples of the above halogenated unsaturated carboxylic acid may include 2,2,3,3-tetrafluoropropylacrylate, 1H,1H,2H,2H-heptadecafluorodecylacrylate, and 2,2,3,3-tetrafluoropropylmethacrylate.

Further, specific examples of monomers of amides of the above unsaturated carboxylic acids and aliphatic polyvalent amine compounds may include methylenebisacrylamide, methylenebismethacrylamide, 1,6-hexamethylenebisacrylamide, and 1,6-hexamethylenebismethacrylamide.

(Photopolymerization Initiator)

Examples of the photopolymerization initiator used in the present invention may include 1,3-di(t-butyldioxycarbonyl)benzophenone, 3,3',4,4'-tetrakis(t-butyldioxycarbonyl)benzophenone, N-phenylglycine, 2,4,6-tris(trichloromethyl)-s-triazine, 3-phenyl-5-isoxazolone, 2-mercaptobenzimidazole, and imidazole dimers. Among these compounds, the photopolymerization initiator used in the present invention is preferably decomposed and treated after a hologram is recorded from the viewpoint of stabilization of the recorded volume hologram. In view of this, an organic peroxide type photopolymerization initiator is preferably used because it is easily decomposed by irradiation with ultraviolet rays.

(Sensitizing Dye)

Examples of the sensitizing dye used in the present invention may include thiopyrylium salt type dyes, merocyanine type dyes, quinoline type dyes, styrylquinoline type dyes, ketocoumarin type dyes, thioxanthene type dyes, xanthene type dyes, oxonol type dyes, cyanine dyes, rhodamine dyes, thiopyrylium salt type dyes, pyrylium ion type dyes, and diphenyliodonium ion type dyes.

(ii) Second Photosensitive Material

Next, the second photosensitive material used in the present invention will be explained. As mentioned above, the second photosensitive material contains a cationic polymerizable compound, a radically polymerizable compound, photo-radical polymerization initiator type and a cationic polymerization initiator type.

Here, as a method for recording a volume hologram in the volume hologram layer, when such a second photosensitive material is used, a method is used in which laser light that sensitizes the photo-radical polymerization initiator type is applied and then light having a wavelength different from that of the laser light by which the photo-cationic polymerization initiator type is sensitized is applied.

(Cationic Polymerizable Compound)

As the above cationic polymerizable compound, those in a liquid state at ambient temperature are preferably used from the point that the polymerization of a radically polymerizable compound is preferably carried out in a composition having a relatively low viscosity. Examples of the cationic polymerizable compound may include diglycerol diether, pentaerythritol polydiglycidyl ether, 1,4-bis(2,3-epoxypropoxyperfluoroisopropyl)cyclohexane, sorbitol polyglycidyl ether, 1,6-hexanediol glycidyl ether, polyethylene glycol diglycidyl ether, and phenyl glycidyl ether.

(Radically Polymerizable Compound)

As the above radically polymerizable compound, those having at least one ethylenic unsaturated double bond in a molecule are preferable. Further, the average refractive index of the radically polymerizable compound used in the present invention is preferably larger and more preferably larger by 0.02 or more than that of the above cationic polymerizable compound. This reason is that a volume hologram is formed by a difference in refractive index between the radically polymerizable compound and the cationic polymerizable compound, and that, therefore, when the difference in average refractive index is equal to or less than the above value, the modulation of the refractive index is insufficient. Examples of the radically polymerizable compound used in the present invention may include acrylamide, methacrylamide, styrene, 2-bromostyrene, phenylacrylate, 2-phenoxyethylacrylate, 2,3-naphthalenedicarboxylic acid (acryloxyethyl)monoester, methylphenoxyethylacrylate, nonylphenoxyethylacrylate, and β-acryloxyethylhydrogen phthalate.

(Photo-Radical Polymerization Initiator Type)

Any material may be used as the photo-radical polymerization initiator type to be used in the present invention without any particular limitation as long as it can produce active radicals by the first exposure when the volume hologram is recorded and the active radicals can polymerize the radically polymerizable compound. Further, the photo-radical polymerization initiator type may be used in combination with a sensitizer which is generally a component absorbing light, an active radical generating compound and an acid generating compound. Although there is the case where a color compound such as a dye is used as a sensitizer in the photo-radical polymerization initiator type to absorb visible laser light, a cyanine type dye is preferably used when a colorless transparent hologram is to be produced. This reason is that because cyanine type dyes are easily decomposed by light, the dye in the hologram is decomposed by the post-exposure or by allowing the hologram to stand under room light or sunlight for several hours to several days, so that it has no absorption in the visible range, whereby a colorless transparent volume hologram can be obtained.

Specific examples of the above cyanine type dye include anhydro-3,3'-dicarboxymethyl-9-ethyl-2,2'-thiacarbocyaninebetaine, anhydro-3-carboxymethyl-3',9'-diethyl-2,2'-thiacarbocyanine betaine, 3,3',9-triethyl-2,2'-thiacarbocyanine.iodine salt, 3,9-diethyl-3'-carboxymethyl-2,2'-thiacarbocyanine.iodine salt, 3,3',9-triethyl-2,2'-(4,5,4',5'-dibenzo)thiacarbocyanine.iodine salt, 2-[3-(3-ethyl-2-benzothiazolidene)-1-propenyl]-6-[2-(3-ethyl-2-benzothiazolidene)ethylideneimino]-3-ethyl-1,3,5-thiadiazolium.iodine salt, 2-[[3-allyl-4-oxo-5-(3-n-propyl-5,6-dimethyl-2-benzothiazolidene)-ethylidene-2-thiazolinylidene]methyl]3-ethyl-4,5-diphenylthiazolinium.iodine salt, 1,1',3,3,3',3'-hexamethyl-2,2'-indotricarbocyanine.iodine salt, 3,3'-diethyl-2,2'-thiatricarbocyanine.perchlorate, anhydro-1-ethyl-4-methoxy-3'-carboxymethyl-5'-chloro-2,2'-quinothiacyaninebetaine, anhydro-5,5'-diphenyl-9-ethyl-3,3'-disulfopropyloxacarbocyaninehydroxide.triethylamine salt. These compounds may be used either singly or in combinations of two or more types.

Examples of the above active radical generating compound include diaryliodonium salts and 2,4,6-substituted-1,3,5-triazines. It is particularly preferable to use diaryliodonium salts when high photosensitivity is necessary. Specific examples of the above diaryliodonium salts include chlorides, bromides, tetrafluoroborates, hexafluorophosphates, hexafluoroarsenates, hexafluoroantimonates, trifluoromethanesulfonates, and 9,10-dimethoxyanthracene-2-sulfonates of diphenylidonium, 4,4'-dichlorodiphenyliodinium, 4,4'-dimethoxydiphenyliodinium, 4,4'-ditertiarybutyldiphenyliodonium, 3,3'-dinitrodiphenyliodonium, or the like. Further, specific examples of 2,4,6-substituted-1,3,5-triazines include 2-methyl-4,6-bis(trichloromethyl)-1,3,5-triazine, 2,4,6-tris(trichloromethyl)-1,3,5-triazine, 2-phenyl-4,6-bis(trichloromethyl)-1,3,5-triazine, 2,4-bis(trichloromethyl)-6-(p-methoxyphenylvinyl)-1,3,5-triazine, and 2-(4'-methoxy-1'-naphthyl)-4,6-bis(trichloromethyl)-1,3,5-triazine.

(Photo-Cationic Polymerization Initiator Type)

Any material may be used as the photo-cationic polymerization initiator type used in the present invention without any particular limitation insofar as it is a polymerization initiator that has low sensitivity to light of the first exposure when the volume hologram is recorded and is sensitized by the light of the post-exposure carried out by applying light having a wavelength different from that of the first exposure to generate a Broensted acid or a Lewis acid to thereby polymerize the cationic polymerizable compound. In particular, it is preferable to use a polymerization initiator which does not polymerize the cationic polymerizable compound during the first exposure in the present invention. Examples of the photo-cationic polymerization initiator type include diaryliodonium salts, triarylsulfonium salts and iron allene complexes. Preferable examples of the diaryliodonium salts include tetrafluoroborate, hexafluorophosphate, hexafluoroarsenate, or hexafluoroantimonate of the iodoniums shown as examples of the photo-radical polymerization initiator type mentioned above. Preferable examples of the triarylsulfonium salts include triphenylsulfonium and 4-tertiary butyltriphenylsulfonium.

(Others)

In the second photosensitive material, a binder resin, thermal polymerization preventive, silane coupling agent, plasticizer and colorants may be combined according to the need. The binder resin is used to improve the film formation ability of the composition before a hologram layer is recorded and to improve the uniformity of film thickness, and to ensure stable existence of interference fringes formed by the polymerization when light such as laser light is applied until post-exposure is carried out. As the binder resin, any binder resin may be used insofar as it is highly compatible with cationic polymerizable compounds and radically polymerizable compounds. Examples of the binder resin include chlorinated polyethylene, polymethylmethacrylate, copolymers of methylmethacrylate and other alkyl(meth)acrylates, copolymers of vinyl chloride and acrylonitrile, and polyvinyl acetates. The binder resin may contain reactivity such as a cationic polymerizable group at its side chain or principal chain.

(2) Volume Hologram Layer

In the volume hologram layer in the present invention, microparticles may be added according to the need besides the aforementioned structural materials. When such microparticles are contained in the volume hologram layer, defects are intentionally developed, thereby enabling the promotion of brittleness of the volume hologram layer, and therefore, the volume hologram layer can be provided with good foil cutting characteristics.

As the above microparticles, any material may be used insofar as it has a predetermined particle diameter without any particular limitation, and organic microparticles containing, as a resin skeleton, for example, a low-density polyethylene, high-density polyethylene, polypropylene, (meth) acryl, polyvinyl chloride, polyamide, polyimide, polycarbonate, epoxy, urethane, or copolymers of these compounds, and inorganic particles of, for example, silica, mica, talc, clay, graphite, calcium carbonate, alumina, aluminum hydroxide, ferrite, China clay, kaolin, titanium dioxide, glass flake, asbestos, pyrophyllite powder, silica powder, barium sulfate, scherben, chamotte, and titania may be used. These microparticles may be used either singly or as a mixture of two or more types.

The microparticles used in the present invention are preferably fluorine type microparticles which are particles of fluorine-containing type resin obtained by substituting apart or all of hydrogen atoms of the skeleton or side chain of the resin of the above organic microparticles with fluorine atoms, or titania microparticles. This is because the foil cutting characteristics can be improved.

Further, because the fluorine type microparticles which are particles of fluorine-containing type resin have a small coefficient of friction, they are reduced in interaction with other components contained in the volume hologram layer and can therefore impart brittleness to the volume hologram layer in a small amount. As the fluorine type microparticles, those obtained by partial or entire fluorination of the organic microparticles exemplified above or those obtained by treating the surface of microparticles with a fluorine-containing compound may be used. Among these microparticles, fluorine type microparticles utilizing a (meth)acrylate compound are preferably used. Specific examples of the microparticles include monomer polymers using one or more types of fluorine monomers represented by a fluorine-containing acrylate described in JP-A H05-194322, a fluorine-containing (meth) acrylate compound described in JP-A H09-104655, and a fluorine-containing polyfunctional (meth)acrylate compound described in JP-A 2001-072646, or monomer copolymers obtained by copolymerizing each of the above monomer with other compound which contains no fluorine atom and contains at least one ethylenic unsaturated bond in a molecule, fluorine-containing resin complex microparticles shown in JP-A H06-073137, and fluorine-containing (meth)acrylate copolymers shown in JP-A H05-194668 A. These fluorine type microparticles may be used either singly or in combinations of two or more types.

Further, no particular limitation is imposed on the thickness of the volume hologram layer used in the present invention insofar as it is within a range where a predetermined volume hologram image is recorded and may be optionally regulated corresponding to the type of the above structural material. Particularly, the thickness of the volume hologram layer used in the present invention is preferably in a range from 1 µm to 50 µm and more preferably in a range from 3 µm to 25 µm.

Incidentally, when the thickness of the volume hologram layer is large, there is the case where this causes easy occurrence of foil cutting failure of the volume hologram layer when the volume hologram transfer foil of the present invention is used.

4. Heat Seal Layer

Next, the heat seal layer used in the present invention will be explained. The heat seal layer used in the present invention contains a thermoplastic resin and has the ability to bind the volume hologram layer with an adherend when manufacturing the volume hologram laminate by using the volume hologram transfer foil of the present invention. The heat seal layer used in the present invention is formed on the volume hologram layer.

The heat seal layer used in the present invention will be explained in detail.

There is no particular limitation to the thermoplastic resin to be used for the heat seal layer in the present invention insofar as it can bind the volume hologram layer with an adherend corresponding to the type of adherend to which the volume hologram layer is transferred from the volume hologram transfer foil of the present invention. Examples of the thermoplastic resin may include an ethylene/vinyl acetate copolymer resin, vinyl chloride/vinyl acetate copolymer resin, polyamide resin, polyester resin, polyethylene resin, ethylene/isobutylacrylate copolymer resin, butyral resin, polyvinyl acetate and its copolymer resin, ionomer resin, acid-modified polyolefin type resin, (meth)acryl type resins such as an acryl type/methacryl type resin, acrylate type resin, ethylene/(meth)acrylic acid copolymer, ethylene/(meth) acrylate copolymer, polymethylmethacrylate type resin, cellulose type resin, polyvinyl ether type resin, polyurethane resin, polycarbonate resin, polypropylene resin, epoxy resin, phenol resin, vinyl type resin, maleic acid resin, alkyd resin, polyethylene oxide resin, urea resin, melamine resin, melamine/alkyd resin, silicone resin, rubber type resin, styrene/butadiene/styrene block copolymer (SBS), styrene/isoprene/styrene block copolymer (SIS), styrene/ethylene/butylene/styrene block copolymer (SEGS) and styrene/ethylene/propylene/styrene block copolymer (SEPS). In the present invention, any of these thermoplastic resins may be preferably used.

Incidentally, these thermoplastic resins in the present invention may be used either singly or in combinations of two or more types.

The heat seal layer used in the present invention may contain additives other than the above thermoplastic resins. Examples of these additives used in the present invention may include a dispersant, filler, plasticizer and antistatic agent.

Although there is no particular limitation to the thickness of the heat seal layer used in the present invention and the thickness is properly selected according to, for example, the structural material of the volume hologram layer and the type of adherend to which the volume hologram layer is transferred using the volume hologram transfer foil of the present invention. In particular, the thickness of the heat seal layer used in the present invention is preferably in a range from 1 µm to 50 µm and more preferably in a range from 1 µm to 25 µm. This is because there is the possibility of insufficient adhesive property between the volume hologram layer and the adherend when the thickness is less than the above range. This is also because when the thickness exceeds the above range, the temperature of the heat seal layer to be heated becomes too high when the volume hologram layer is transferred from the volume hologram transfer foil of the present invention and there is therefore the possibility of the occurrence of damages to the adherend and the like.

5. Other Structures

The volume hologram transfer foil of the present invention is provided with at least the aforementioned base material, protective layer, volume hologram layer, and heat seal layer, and may have optional structures besides these structures according to the need. Any structure may be used as these optional structures to be used in the present invention without any particular limitation insofar as it can provide desired functions to the volume hologram transfer foil of the present invention. These optional structures will be explained.

(1) Primer Layer

Examples of the optional structures to be used in the present invention may include a primer layer used to improve the adhesion between the volume hologram layer and the heat seal layer. Examples of the primer layer may include those using a polyurethane, polyester, polyvinyl chloride resin, polyvinyl acetate type resin, vinyl chloride/vinyl acetate copolymer, acryl resin, polyvinyl alcohol type resin, polyvinyl acetal resin, copolymer of ethylene and vinyl acetate or an acrylic acid, or epoxy resin.

(2) Barrier Layer

Examples of the optional structures to be used in the present invention may include, besides the above primer layer, a barrier layer formed between the above volume hologram layer and the heat seal layer. This reason is as follows. Specifically, a movement of low molecular weight components from the volume hologram layer to other layers is made with time depending on the combination of the photosensitive material used in the volume hologram layer and the thermoplastic resin used in the heat seal layer and there is the case where this causes the transfer of the regeneration wavelength of the volume hologram recorded in the volume hologram layer to the blue side (shorter wavelength side). However, when the barrier layer is formed, this problem can be solved.

Any material may be used as the material used for the barrier layer without any particular limitation insofar as it can develop desired barrier characteristics. However, transparent organic resin materials are usually used as the material for the barrier layer. Examples of the transparent organic resin material to be used in the present invention may include nonsolvent type tri- or more functional and preferably hexa- or more functional ionizing radiation-curable epoxy-modified acrylate resins, urethane-modified acrylate resins and acryl-modified polyester resins which are reactive to ionizing radiation such as ultraviolet rays or electron rays.

(3) Ultraviolet Preventive Layer

Examples of the optional structure used in the present invention may include an ultraviolet preventive layer formed between the protective layer and the volume hologram layer, or between the above base material and the protective layer. The ultraviolet preventive layer is disposed to prevent the hologram image or color from deteriorating with time when the transferred volume hologram layer is exposed to sunlight or lighting sources for a long period of time.

With regard to the ultraviolet preventive ability required for the ultraviolet preventive layer, the total absorbance of all layers including the ultraviolet preventive layer and the protective layer disposed between the volume hologram layer and the base material is preferably 0.5 or more and more preferably 0.7 or more at a wavelength of 340 nm. This reason is that when the total absorbance of all layers including the ultraviolet preventive layer and the protective layer existing between the volume hologram layer and the base material is low, there is a fear that the hologram image or color is significantly deteriorated with time when the transferred volume hologram layer is exposed to sunlight or lighting sources for a long period of time.

Incidentally, the total absorbance of all layers including the ultraviolet preventive layer and the protective layer disposed between the volume hologram layer and the base material may be measured in the following manner. Specifically, first, the heat seal layer and the volume hologram layer are removed from the volume hologram transfer foil. Then, light having a wavelength of 340 nm is made to be incident to the laminate including the base material, ultraviolet preventive layer, and protective layer which are left unremoved at this time in the direction of thickness to measure absorbance. In succession, the absorbance of all layers including the ultraviolet preventive layer and the protective layer disposed between the volume hologram layer and the base material is found by using the absorbance of the base material which is measured in advance as a reference. The absorbance A is calculated from the equation: $A=-\log(I'/I)$, where I is the intensity of the incident light and I' is the intensity of the light passing through the laminate. The absorbance can be measured, for example, by an UV/Vis/NIR microscopic spectrophotometer NSV-350™, manufactured by JASCO CORPORATION or an UV/Vis/NIR spectrophotometer UV-3100PC™, manufactured by Shimadzu Corporation.

The ultraviolet preventive layer contains at least an ultraviolet absorber. As the ultraviolet absorber, the same one as an ultraviolet absorber used as an UV absorbing component contained in the protective layer may be used though a known one is used.

Further, the ultraviolet preventive layer may contain a binder resin as required. Examples of the binder resin include mixtures of one or more types of acryl type resins such as a polymethacrylic acid, polymethacrylamide, polymethylmethacrylate, polyethylmethacrylate, and polybutylacrylate; vinyl type resins such as polyvinylacetate, vinyl chloride/vinyl acetate copolymer, polyvinyl alcohol, and polyvinylbutyral; cellulose derivatives such as ethyl cellulose, nitrocellulose, and cellulose acetate, polyester resins, polymethacrylate resins, polyvinyl chloride resins, and silicone resins, ionizing radiation-curable resins which react with ultraviolet rays or electron rays, heat-curable resins, and thermoplastic resins.

6. Method of Producing the Volume Hologram Transfer Foil

Although a known method may be usually used as the method of producing a volume hologram transfer foil to produce the volume hologram transfer foil of the present invention, examples of the method of producing the volume hologram transfer foil include the following method. Specifically, a protective layer-forming coating solution is applied to a base material to form a protective layer, also, a volume hologram recording material is applied to a separate base material to photograph and record a volume hologram by using laser light, thereby forming a volume hologram layer. The both base materials are overlapped on each other such that the volume hologram layer is in contact with the surface of the protective layer to obtain a laminate having a structure of base material/volume hologram layer/protective layer/base material and then, the entire surface of the laminate is irradiated with ultraviolet rays to fix the volume hologram layer. Then, the base material on the volume hologram layer side of the base material/volume hologram layer/protective layer/base material laminate is peeled off and a heat seal layer is applied to produce the volume hologram transfer foil.

7. Application of the Volume Hologram Transfer Foil

The volume hologram transfer foil of the present invention is used to produce a volume hologram laminate having a structure in which the volume hologram layer is applied to an adherend by transferring the volume hologram layer to the adherend.

The present invention is not limited to the aforementioned embodiments. These embodiments are examples and whatever having substantially the same structure and produces the same action effect as the technical spirit described in the claims of the present invention is embraced by the technical scope of the present invention.

EXAMPLES

The present invention will be explained in more detail by way of examples, which are not intended to be limiting of embodiments of the present invention.

Example 1

First Laminate

A PET film (trademark: Lumirror T60 (thickness: 50 μm), manufactured by Toray Industries, Inc.) was prepared as a first film, and a volume hologram recording material having the following composition was applied to the PET film by gravure coating such that the dry film thickness was 6 μm. A PET film (SP-PET (thickness: 50 μm), manufactured by Mitsui Chemicals Tohcello Inc.) processed by surface release treatment was laminated on the coated surface of the volume hologram recording material to manufacture a first laminate.

| | |
|---|---|
| Binder resin {polymethylmethacrylate type resin (molecular weight: 200,000)} | 50 parts by weight |
| 3,9-Diethyl-3'-carboxymethyl-2,2'-thiacarbocyanine iodide | 0.5 part by weight |
| Diphenyliodonium hexafluoroantimonate | 6 parts by weight |
| 2,2-bis[4-(acryloxydiethoxy)phenyl]propane | 80 parts by weight |
| 1,6-hexanediol diglycidyl ether | 80 parts by weight |
| Fluorine type microparticles | 8 parts by weight |
| Solvent (methyl isobutyl ketone/n-butanol = 1/1 (ratio by weight) | 200 parts by weight |

Second Laminate of Base Material/Peelable Protective Layer

A PET film (trademark: SG-1 (thickness: 38 μm), manufactured by Panac Corporation) was prepared as a second film (base material) and a protective layer solution having the following composition was applied as a protective layer to the second film by gravure coating such that the dry film thickness was 3 μm.

| | |
|---|---|
| Urethaneacrylate resin (trademark: Shikoh UV-7600B, manufactured by The Nippon Synthetic Chemical Industry Co., Ltd., molecular weight: 1400, Number of functional groups: 6, pencil hardness: 3H, cure shrinkage: 6.3) | 60 parts by weight |
| Urethaneacrylate resin (trademark: Shikoh UV-3500BA, manufactured by The Nippon Synthetic Chemical Industry Co., Ltd., molecular weight: 13000, Number of functional groups: 2, glass transition temperature: 1° C., pencil hardness: 6B>, Young's modulus: 4 N/mm$^2$, rupture strength: 5 N/mm$^2$, rupture elongation: 140%) | 40 parts by weight |
| Polyethylene wax (molecular weight: 10000, average particle diameter: 5 μm) | 1 part by weight |
| Solvent (methyl ethyl ketone) | 400 parts by weight |
| Photopolymerization initiator (trademark: Irgacure 184, manufactured by Ciba Speciality Chemicals K.K. Japan) | 4 parts by weight |

Recording of a Volume Hologram

A volume hologram was photographed and recorded in the first laminate having the structure: first film/volume hologram recording material layer/surface release-treated PET film by using laser light having a wavelength of 532 nm. After that, the second laminate having the structure: second film/protective layer was overlapped on the volume hologram layer which was exposed by peeling the surface release-treated PET film such that the protective layer side of the second laminate was in contact with the volume hologram layer. The overlapped laminates were made to pass through a nipped pair of heat rollers kept at 80° C. to obtain a laminate having the structure: first film/volume hologram layer/protective layer/second film. Then, the entire surface of the obtained laminate was irradiated with ultraviolet rays at a dose of 2500 mJ/cm$^2$ by using a high-pressure mercury lamp to fix the volume hologram layer.

Coating of a Heat Seal Layer

The first film was peeled from the laminate obtained above and having the structure: first film/volume hologram layer/protective layer/second film and a material having the following composition was applied to the surface of the volume hologram layer by gravure coating such that the dry film thickness of the material was 4 μm. The drying temperature was 100° C.

| | |
|---|---|
| Polyester resin (trademark: Vyron 550, manufactured by Toyobo Co., Ltd., Tg: −15° C., molecular weight: 28000) | 20 parts by weight |
| Solvent (methyl ethyl ketone/toluene = 1/1 (mass ratio)) | 80 parts by weight |

Example 2

A volume hologram transfer foil was manufactured in the same manner as in Example 1 except that the composition of the protective layer solution was altered to the following composition.

| | |
|---|---|
| Urethaneacrylate resin (trademark: Shikoh UV-7600B, manufactured by The Nippon Synthetic Chemical Industry Co., Ltd., molecular weight: 1400, Number of functional groups: 6, pencil hardness: 3H, cure shrinkage: 6.3) | 60 parts by weight |
| Urethaneacrylate resin (trademark: Shikoh UV-3210EA, manufactured by The Nippon Synthetic Chemical Industry Co., Ltd., molecular weight: 9000, Number of functional groups: 2, glass transition temperature: −10° C., pencil hardness: 6B>, cure shrinkage: 4 to 5, Young's modulus: 5 N/mm$^2$, rupture strength: 4 N/mm$^2$, rupture elongation: 70%) | 40 parts by weight |
| Polyethylene wax (molecular weight: 10000, average particle diameter: 5 μm) | 1 part by weight |
| Solvent (methyl ethyl ketone) | 400 parts by weight |
| Photopolymerization initiator (trademark: Irgacure 184, manufactured by Ciba Speciality Chemicals K.K. Japan) | 4 parts by weight |

Example 3

A volume hologram transfer foil was manufactured in the same manner as in Example 1 except that the composition of the protective layer solution was altered to the following composition.

| | |
|---|---|
| Urethaneacrylate resin (trademark: Shikoh UV-7620EA, manufactured by The Nippon Synthetic Chemical Industry Co., Ltd., molecular weight: 4100, Number of functional groups: 9, pencil hardness: 3H) | 60 parts by weight |

| | |
|---|---|
| Urethaneacrylate resin (trademark: Shikoh UV-3500BA, manufactured by The Nippon Synthetic Chemical Industry Co., Ltd., molecular weight: 13000, Number of functional groups: 2, glass transition temperature: 1° C., pencil hardness: 6B>, Young's modulus: 4 N/mm$^2$, rupture strength: 5 N/mm$^2$, rupture elongation: 140%) | 40 parts by weight |
| Polyethylene wax (molecular weight: 10000, average particle diameter: 5 μm) | 1 part by weight |
| Solvent (methyl ethyl ketone) | 400 parts by weight |
| Photopolymerization initiator (trademark: Irgacure 184, manufactured by Ciba Speciality Chemicals K.K. Japan) | 4 parts by weight |

Example 4

A volume hologram transfer foil was manufactured in the same manner as in Example 1 except that the composition of the protective layer solution was altered to the following composition.

| | |
|---|---|
| Urethaneacrylate resin (trademark: Shikoh UV-7620EA, manufactured by The Nippon Synthetic Chemical Industry Co., Ltd., molecular weight: 4100, Number of functional groups: 9, pencil hardness: 3H) | 60 parts by weight |
| Urethaneacrylate resin (trademark: Shikoh UV-3500BA, manufactured by The Nippon Synthetic Chemical Industry Co., Ltd., molecular weight: 13000, Number of functional groups: 2, glass transition temperature: 1° C., pencil hardness: 6B>, Young's modulus: 4 N/mm$^2$, rupture strength: 5 N/mm$^2$, rupture elongation: 140%) | 40 parts by weight |
| Polyethylene wax (molecular weight: 10000, average particle diameter: 5 μm) | 3 parts by weight |
| Solvent (methyl ethyl ketone) | 400 parts by weight |
| Photopolymerization initiator (trademark: Irgacure 184, manufactured by Ciba Speciality Chemicals K.K. Japan) | 4 parts by weight |

Example 5

A volume hologram transfer foil was manufactured in the same manner as in Example 1 except that the composition of the protective layer solution was altered to the following composition.

| | |
|---|---|
| Urethaneacrylate resin (trademark: Shikoh UV-7600B, manufactured by The Nippon Synthetic Chemical Industry Co., Ltd., molecular weight: 1400, Number of functional groups: 6, pencil hardness: 3H, cure shrinkage: 6.3) | 50 parts by weight |
| Urethaneacrylate resin (trademark: Shikoh UV-3500BA, manufactured by The Nippon Synthetic Chemical Industry Co., Ltd., molecular weight: 13000, Number of functional groups: 2, glass transition temperature: 1° C., pencil hardness: 6B>, Young's modulus: 4 N/mm$^2$, rupture strength: 5 N/mm$^2$, rupture elongation: 140%) | 50 parts by weight |
| Polyethylene wax (molecular weight: 10000, average particle diameter: 5 μm) | 1 part by weight |
| Ultraviolet absorbing monomer (2-[2'-hydroxy-5'-(methacryloyloxy)ethylphenyl]-2H-benzotriazole) | 1 part by weight |
| Acetophenone type photopolymerization initiator (trademark: Irgacure 184, manufactured by Ciba Speciality Chemicals K.K. Japan) | 2 parts by weight |
| Phosphorous type photopolymerization initiator (2,4,6-trimethylbenzoyldiphenylphosphine oxide) (trademark: Lucirin TPO, manufactured by BASF Japan Ltd.) | 2 parts by weight |
| Solvent (methyl ethyl ketone) | 400 parts by weight |

Example 6

A volume hologram transfer foil was manufactured in the same manner as in Example 1 except that the composition of the protective layer solution was altered to the following composition.

| | |
|---|---|
| Urethaneacrylate resin (trademark: Shikoh UV-7600B, manufactured by The Nippon Synthetic Chemical Industry Co., Ltd., molecular weight: 1400, Number of functional groups: 6, pencil hardness: 3H, cure shrinkage: 6.3), | 50 parts by weight |
| Urethaneacrylate resin (trademark: Shikoh UV-3500BA, manufactured by The Nippon Synthetic Chemical Industry Co., Ltd., molecular weight: 13000, Number of functional groups: 2, glass transition temperature: 1° C., pencil hardness: 6B>, Young's modulus: 4 N/mm$^2$, rupture strength: 5 N/mm$^2$, rupture elongation: 140%) | 50 parts by weight |
| Polyethylene wax (molecular weight: 10000, average particle diameter: 5 μm) | 1 part by weight |
| Ultraviolet absorbing monomer (2-hydroxy-4-(2-acryloyloxy)ethoxybenzophenone) | 1 part by weight |
| Acetophenone type photopolymerization initiator (trademark: Irgacure 184, manufactured by Ciba Speciality Chemicals K.K. Japan) | 2 parts by weight |
| Phosphorous type photopolymerization initiator (2,4,6-trimethylbenzoyldiphenylphosphine oxide) (trademark: Lucirin TPO, manufactured by BASF Japan Ltd.) | 2 parts by weight |
| Solvent (methyl ethyl ketone) | 400 parts by weight |

Evaluation of Transfer Characteristics

The transfer characteristics of the transfer foils obtained in Examples 1 to 6 were evaluated using a commercially available heat laminator for sheet transfer in the following condition: transfer temperature: 150° C., transfer speed: 1 m/min. A hologram extending from the transfer start portion to transfer end portion of the volume hologram transfer foil could be transferred to the sheet.

Evaluation of Light Resistance

A light resistance test for the transfer foils obtained in Examples 1 to 4 was made using a xenon lamp. The test was made in the following condition: illuminance: 550 W/m$^2$, wavelength band: 300 nm to 800 nm, black panel temperature: 63° C., irradiation time: 100 hr. All of these transfer foils enabled the transferred hologram to be viewed though the visibility was deteriorated a little.

The above light resistance of each of the transfer foils obtained in Examples 5 and 6 was evaluated. The transferred image could be viewed without any deterioration in visibility.

Comparative Example 1

A volume hologram transfer foil was manufactured in the same manner as in Example 1 except that the polyethylene wax was eliminated from the protective layer solution used in Example 1.

Comparative Example 2

A volume hologram transfer foil was manufactured in the same manner as in Example 2 except that the polyethylene wax was eliminated from the protective layer solution used in Example 2.

Comparative Example 3

A volume hologram transfer foil was manufactured in the same manner as in Example 3 except that the polyethylene wax was eliminated from the protective layer solution used in Example 3.

Comparative Example 4

A volume hologram transfer foil was manufactured in the same manner as in Example 1 except that the method of manufacturing the second laminate was altered to the following method.

A PET film (trademark: Lumirror T60 (50 μm), manufactured by Toray Industries, Inc.) was prepared as a second film and the following composition was used as the protective layer to manufacture a volume hologram transfer foil.

| | |
|---|---|
| Thermoplastic polymethylmethacrylate resin (molecular weight: 35000) | 97 parts by weight |
| Polyethylene wax (molecular weight: 10000, average particle diameter: 5 μm) | 3 parts by weight |
| Solvent (methyl ethyl ketone/toluene = 1/1 ratio by weight) | 400 parts by weight |
| Photopolymerization initiator (trademark: Irgacure 184, manufactured by Ciba Speciality Chemicals K.K. Japan) | 4 parts by weight |

Comparative Example 5

A volume hologram transfer foil was manufactured in the same manner as in Example 1 except that the method of manufacturing the second laminate was altered to the following method.

| | |
|---|---|
| Urethaneacrylate resin (trademark: Shikoh UV-7600B, manufactured by The Nippon Synthetic Chemical Industry Co., Ltd., molecular weight: 1400, Number of functional groups: 6, pencil hardness: 3H, cure shrinkage: 6.3), | 20 parts by weight |
| Urethaneacrylate resin (trademark: Shikoh UV-3500BA, manufactured by The Nippon Synthetic Chemical Industry Co., Ltd., molecular weight: 13000, Number of functional groups: 2, glass transition temperature: 1° C., pencil hardness: 6B>, Young's modulus: 4 N/mm², rupture strength: 5 N/mm², rupture elongation: 140%) | 80 parts by weight |
| Polyethylene wax (molecular weight: 10000, average particle diameter: 5 μm) | 1 part by weight |
| Solvent (methyl ethyl ketone) | 400 parts by weight |
| Photopolymerization initiator (trademark: Irgacure 184, manufactured by Ciba Speciality Chemicals K.K. Japan) | 4 parts by weight |

Evaluation of Transfer Characteristics

The transfer characteristics of the transfer foils obtained in Comparative Examples 1 to 5 were evaluated using a commercially available heat laminator for sheet transfer in the following condition: transfer temperature: 150° C., transfer speed: 1 m/min.

The transfer foil was not broken at the transfer start portion but the sheet was broken and caught in the transfer foil side.

From the results of Comparative Examples 1 to 3, the foil cutting characteristics of the protective layer were insufficient and the transfer foil could not be transferred in the case of using the protective layer containing no polyethylene wax.

From the results of Comparative Example 4, it was confirmed that the foil cutting characteristics of the protective layer were insufficient and the transfer foil could not be transferred even in the case of using a protective layer using the thermoplastic resin.

Moreover, from the results of Comparative Example 5, it was confirmed that the foil cutting characteristics of the protective layer were insufficient so that the transfer foil could not be transferred in the case of using a protective layer in which the content of the rupture elongation control component was out of the above range of the ratio by weight of the hard coat component and the rupture elongation control component.

REFERENCE SIGNS LIST

1. Base material
2. Protective layer
3. Volume hologram layer
4. Heat seal layer
5. Rupture elongation control component
6. Hard coat component
7. Foil cutting characteristic control component
10. Volume hologram transfer foil

The invention claimed is:

1. A volume hologram transfer oil comprising:
   a base material;
   a protective layer formed on the base material;
   a volume hologram layer formed on the protective layer and having a volume hologram recorded; and
   a heat seal layer formed on the volume hologram layer, wherein
   the protective layer contains a hard coat component, a rupture elongation control component and a foil cutting characteristic control component,
   the hard coat component includes an ionizing radiation-curable resin obtained by polymerizing a raw material composition which has, as its major component, an oligomer, having a radically polymerizable active group,
   the rupture elongation control component improves a rupture elongation of the protective layer compare to a case when the protective layer is formed only of the hard coat component, and is an ionizing radiation-curable resin obtained by polymerizing a raw material composition which has, as its major component, an oligomer having the radically polymerizable active group,
   the number of the radically polymerizable active groups of the oligomer which is the raw material composition of the rupture elongation control component is less than number of the radically polymerizable active groups of the oligomer which is the raw material composition of the hard coat component,
   a molecular weight of the oligomer which is the raw material composition of the rupture elongation control component is larger than a molecular weight of the oligomer which is the raw material composition of the hard coat component,
   the foil cutting characteristic control component has a thermal expansion coefficient different from those of the hard coat component and the rupture elongation control component, the foil cutting characteristic control component is incompatible with the two components and is dispersed in the form of microparticles in the hard coat component and the rupture elongation control component, and the protective layer is formed by irradiating an ionizing radiation to a coating film of a protective layer-forming coating solution which contains the raw material composition of the hard coat component, the raw material composition of the rupture elongation control component and the foil cutting characteristic control component.

2. The volume hologram transfer foil according to claim 1, wherein the ionizing radiation-curable resin which is the hard coat component of the protective layer is an ultraviolet-curable resin.

3. The volume hologram transfer foil according to claim 1, wherein a monomer or oligomer which is a raw material composition of the ionizing radiation-curable resin which is the rupture elongation control component contains a same functional group of a monomer or oligomer which is a raw material composition of the ionizing radiation-curable resin which is the hard coat component.

4. The volume hologram transfer foil according to claim 1, wherein the foil cutting characteristic control component of the protective layer has a melting point equal in a range from 40° C. to 200° C.

5. The volume hologram transfer foil according to claim 1, wherein the base material is processed by release treatment on a side with the protective layer formed.

6. The volume hologram transfer foil according to claim 1, wherein a weight ratio of the hard coat component and the rupture elongation control component is the hard coat component: rupture elongation control component=3 to 9:7 to 1.

7. The volume hologram transfer foil according to claim 1, wherein a number of functional group of the oligomer which is the raw material composition of the ionizing radiation-curable resin to be used as the hard coat component is in a range from 5 to 50.

8. The volume hologram transfer foil according to claim 1, wherein a molecular weight of the oligomer which is the raw material composition of the ionizing radiation-curable resin to be used as the hard coat component is in a range from 1000 to 5000.

9. The volume hologram transfer foil according to claim 1, wherein a number of functional group of the oligomer which is the raw material composition of the ionizing radiation-curable resin which is the rupture elongation control component is in a range from 1 to 5.

10. The volume hologram transfer foil according to claim 1, wherein a molecular weight of the oligomer which is the raw material composition of the ionizing radiation-curable resin which is the rupture elongation control component is in a range from 3000 to 20000.

11. The volume hologram transfer foil according to claim 1, wherein the rupture elongation of the rupture elongation control component is in a range from 50% to 1000%.

12. The volume hologram transfer foil according to claim 1, wherein a difference in solubility parameter (SP) value is 1 or more between the foil cutting characteristic control component, and the hard coat component and the rupture elongation control component.

13. The volume hologram transfer foil according to claim 1, wherein the foil cutting characteristic control component is polyethylene wax.

14. The volume hologram transfer foil according to claim 1, wherein a content of the foil cutting characteristic control component is in a range from 2 parts by weight to 5 parts by weight based on 100 parts by weight of the total weight of the hard coat component and the rupture elongation control component.

* * * * *